United States Patent [19]

Heiderich et al.

[11] Patent Number: 5,236,640

[45] Date of Patent: Aug. 17, 1993

[54] PROCESS AND CALENDER FOR THE PRODUCTION OF PACKING SHEETS

[75] Inventors: Ralf Heiderich, Cornberg-Rockensuss; Hermann Siebert, Sontra-Ulten, both of Fed. Rep. of Germany

[73] Assignee: Paul Troester Maschinenfabrik, Hanover, Fed. Rep. of Germany

[21] Appl. No.: 769,874

[22] Filed: Oct. 1, 1991

[30] Foreign Application Priority Data

Oct. 2, 1990 [DE]  Fed. Rep. of Germany ....... 4031061

[51] Int. Cl.$^5$ ............... B29C 43/24; B29C 43/46; B29C 43/58
[52] U.S. Cl. .................................. 264/39; 100/49; 100/93 RP; 100/168; 100/170; 264/40.1; 264/40.4; 264/175; 264/310; 425/141; 425/232; 425/367; 425/162
[58] Field of Search ............... 100/93 RP, 155 R, 48, 100/170, 49, 168; 425/141, 143, 230, 135, 363, 232, 367, 162; 264/39, 40.1, 40.4, 40.7, 175, 310

[56] References Cited

U.S. PATENT DOCUMENTS

| | | | |
|---|---|---|---|
| 1,925,904 | 9/1933 | Mayne | 425/141 |
| 2,072,145 | 3/1937 | Wells | 264/39 |
| 2,424,856 | 7/1947 | Schnuck | 425/141 |
| 3,788,789 | 1/1974 | Matsumura | 264/39 |
| 3,844,870 | 10/1974 | Donoghue | 425/141 |
| 3,866,115 | 2/1975 | Lewis | 425/141 |
| 5,030,079 | 7/1991 | Benzing, II | 264/175 |
| 5,048,411 | 9/1991 | Siebert | 100/93 RP |
| 5,131,323 | 7/1992 | Siebert | 100/155 R |
| 5,141,681 | 8/1992 | Ramm | 425/143 |

FOREIGN PATENT DOCUMENTS

| | | | |
|---|---|---|---|
| 676379 | 7/1952 | United Kingdom | 425/230 |
| 747347 | 4/1956 | United Kingdom | 100/170 |

Primary Examiner—Jan H. Silbaugh
Assistant Examiner—Mathieu Vargot
Attorney, Agent, or Firm—Robert E. Burns; Emmanuel J. Lobato

[57] ABSTRACT

A calendar for the production of packing sheets has a heated cylinder of large diameter on which a packing sheet is progressively built-up of layers of rubber-fiber mixture during many revolutions and the cylinder and an unheated counter pressure cylinder of smaller diameter mounted in slidable bearings for rotation and for movement toward and away from the heated cylinder. As the packing sheet is progressively built-up on the heated cylinder, its thickness is continuously measured by feeler rollers pressed lightly against the surface of the packing sheet and associated inductive sensors. In a comparison circuit, the values of thickness-indicating signals received from the sensors are compared with the sum of an initial zero value recorded before rubber-fiber mixture is applied to the circumference of the heated cylinder, and a predetermined desired value. When the value of the thickness indicating signal equals the sum of the zero value and the desired value, the calender is stopped.

21 Claims, 5 Drawing Sheets

PROCESS AND CALENDER FOR THE PRODUCTION OF PACKING SHEETS

FIELD OF INVENTION

The invention relates to a calender for the production of packing sheets comprising a heated cylinder of large diameter which is rotatably supported by stationary bearings in calender stands and on which a packing sheet is built up progressively during many revolutions of the heated cylinder and a counter pressure cylinder of smaller diameter which is rotatably supported by slideable bearings in the calender stands for movement of the smaller cylinder toward and away from the heated cylinder, as well as a microprocessor for controlling the operation of the calender, and to a process for the production of packing sheets.

BACKGROUND OF THE INVENTION

The production of packing sheets on known calenders of this kind required a high degree of skill on the part of the service personnel in order to produce a packing sheet of high quality from rubber-fiber mixtures. The requirements on the service personnel have considerably increased since the replacement of asbestos fiber by other fibers in the process. Some relief has been attained through the introduction of a microprocessor controlling the operation of the calender. However, even when working with a microprocessor controlling the operation of the calender, the requirements remain high. For each packing sheet produced must have an exact predetermined thickness to the tenth of a millimeter whereby the thickness of the sheet over its entire width and its entire length remains constant. Deviation from the required thickness value is cause for the sheet to be sorted out as a second class product whereby it is very difficult to sell because with present day technical requirements first class packing sheets are required.

The required thickness measurement has heretofore been effected with the use of a dial gauge which measures the spacing between the cylinder journal of the heated cylinder and that of the counter pressure cylinder. The difference of the spacing of the cylinder journals from one another, measured during the building up of a packing sheet on the heated cylinder is the thickness of the packing sheet only inexactly because temperature changes occurring during the building up of the packing sheet materially change the cylinder diameter, in particular that of the heated cylinder because of its greater diameter, and because the forces acting on the packing sheet in the cylinder gap further falsify the measurements.

For these reasons an experimental program using a microprocessor has been recorded, the packing sheet produced has been checked and a program that has been found to produce a satisfactory packing sheet has been used for the production of other packing sheets. However other influences such, for example as changes in the ambient temperature, can lead to the production of packing sheets which are not exact reproductions of the master packing sheet.

SUMMARY OF THE INVENTION

The invention eliminates the disadvantages of the state of the art. It is the object of the invention to provide, at little expense, a simple possibility of producing highly exact packing sheets.

The invention consists therein that the thickness of the packing sheet being formed is measured with at least one feeler and the measured value is compared with a desired value, the first measured value after starting rotation of the heated cylinder and before applying the packing sheet material being used as the zero value.

Through this direct measurement of the thickness of the packing sheet in the course of its production, proceeding from the starting value of the measurement at a point of time at which no packing sheet material has been applied to the heated cylinder, there is obtained an exact measured value which can be used to determine the correct time for ending the feeding of material to the cylinder and the correct time for stopping the calender.

The calender in accordance with the invention is characterized by at least one feeler for engaging the circumferential surface of the heated cylinder and a packing sheet being formed thereon, mechanism for raising and holding the feeler, a sensor for sensing the position of the feeler and a circuit in the microprocessor of which an input is connected with the sensor and an output is connected with a switching circuit for stopping the machine and which has a measured value desired value comparison circuit to which the first measured value is fed as the zero value.

The packing sheets produced by this calender have the desired thickness with great exactitude. Moreover the apparatus is not expensive. The packing sheets produced one after another have precisely the same thickness.

It is advantageous when the feeler is formed as a small roller which is pressed with relatively light pressure against the outer surface of a packing sheet being formed on the heated cylinder.

In order for the measurement to remain exact throughout a long period of operation, it is advantageous to provide a cleaning device which is engaged by the feeler roller when in raised position after the production of a packing sheet.

This cleaning device is advantageously a rotating brush, preferably of concave form, of which the axis is inclined to the circumferential face of the feeler roll. This rotating brush in its inclined position drives the feeler roll in a rotating movement while being cleaned, so that all outer face portions of the feeler roll are fully cleaned.

This cleaning device advantageously has a pneumatic drive since an explosive atmosphere may prevail in the region of the calender.

It is advantageous when the feeler roll is rotatably supported on a swingable lever of which the axis is arranged parallel to the axis of the heated cylinder. In this manner, a highly exact bearing of the feeler roll is provided.

It is advantageous when the lever which carries the feeler roller is on a shaft which activates a sensor that is located on a side of the calender stand opposite to the stand on which the heated cylinder is located. In this manner the sensor is arranged in a position in which it is not influenced by the heat of the heated cylinder.

The sensor is advantageously an inductive sensor. With this it is possible to measure movement of the feeler roll to a hundredth part of a millimeter.

The exactitude of the measurement is considerably improved when there are two feeler rollers located respectively between the middle of the heated cylinder and its opposite ends. For three dimensional measurement, it is advantageous when one feeler roll is arranged in front of the heated cylinder and the other behind the heated cylinder.

Calenders of this kind in general have a counter bending device for the counter pressure cylinder because this tends to bend under the pressure used. It is advantageous when a further feeler roller is provided for the middle region of the heated cylinder which is connected with a circuit of the microprocessor controlling the counter bending device.

It is advantageous to lift the feeler rollers from the heated cylinder at the end of the production process in order to facilitate the removal of the produced packing sheet from the heated cylinder and to avoid damaging the feeler rollers in such removal.

It is advantageous to use a cylinder-piston device for effecting such lifting of the feeler rollers.

BRIEF DESCRIPTION OF DRAWINGS

The essence of the invention will be more fully understood from the following description of an embodiment of the invention shown schematically by way of example in the accompanying drawings in which.

DESCRIPTION OF PREFERRED EMBODIMENT

Figure 1:
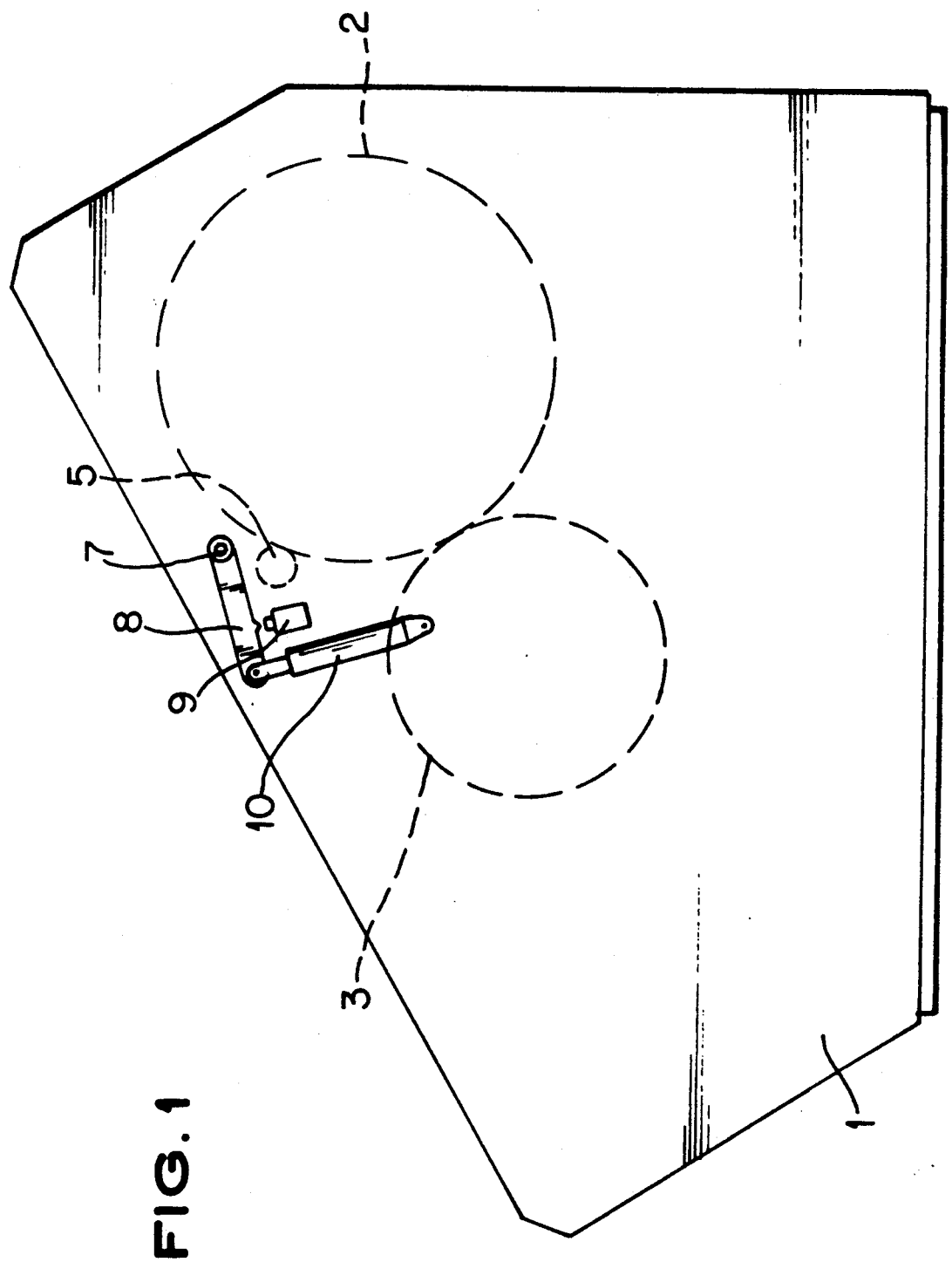
FIG. 1 is a schematic side elevation of a calender in accordance with the invention.

A heated cylinder 2 and a counter-pressure cylinder 3 are rotatably supported in calender stands 1. The heated cylinder is of large diameter and is rotatably supported by stationary bearings in the calender stands. The unheated counter-pressure cylinder 3 is of smaller diameter than the heated cylinder and is supported by bearings which are slidable in the calender stands for movement of the unheated cylinder 3 toward and away from the heated cylinder 2. On the heated cylinder 2 a packing sheet 4 is progressively built up, during many revolutions of the cylinders 2 and 3, from a rubber-fiber mixture fed to the gap between the heated cylinder 2 and the unheated cylinder 3 by hand or by a suitable feeding device, for example an elongated hopper, (not shown). A feeler roller 5 lies on the outer circumferential surface of the heated cylinder 2 at the beginning of an operation and then on the outer surface of the packing sheet 4 as the packing sheet is progressively built up on the heated cylinder. The feeler roller 5 is rotatably supported on a lever 6 which extends from a shaft 7 which is rotatably supported parallel to the axis of the heated cylinder and which carries on its end a further lever 8 the position of which is sensed by an inductive sensor 9 and which is connected with a pneumatic cylinder-piston unit 10 for raising the feeler roller 5 from the heated cylinder at the end of an operation for forming a packing sheet.

In its raised position, the feeler roller 5 is engaged by a rotating brush 11 which has a concave circumferential surface and which is driven in rotation by a pneumatic motor 12. The axis of the rotating brush 11 is inclined with respect to the axis of the feeler roller 5. Thereby the feeler roller 5 receives a rotation movement during the cleaning operation so that the entire outer surface of the feeler roller is effectively cleaned.

Figure 2:
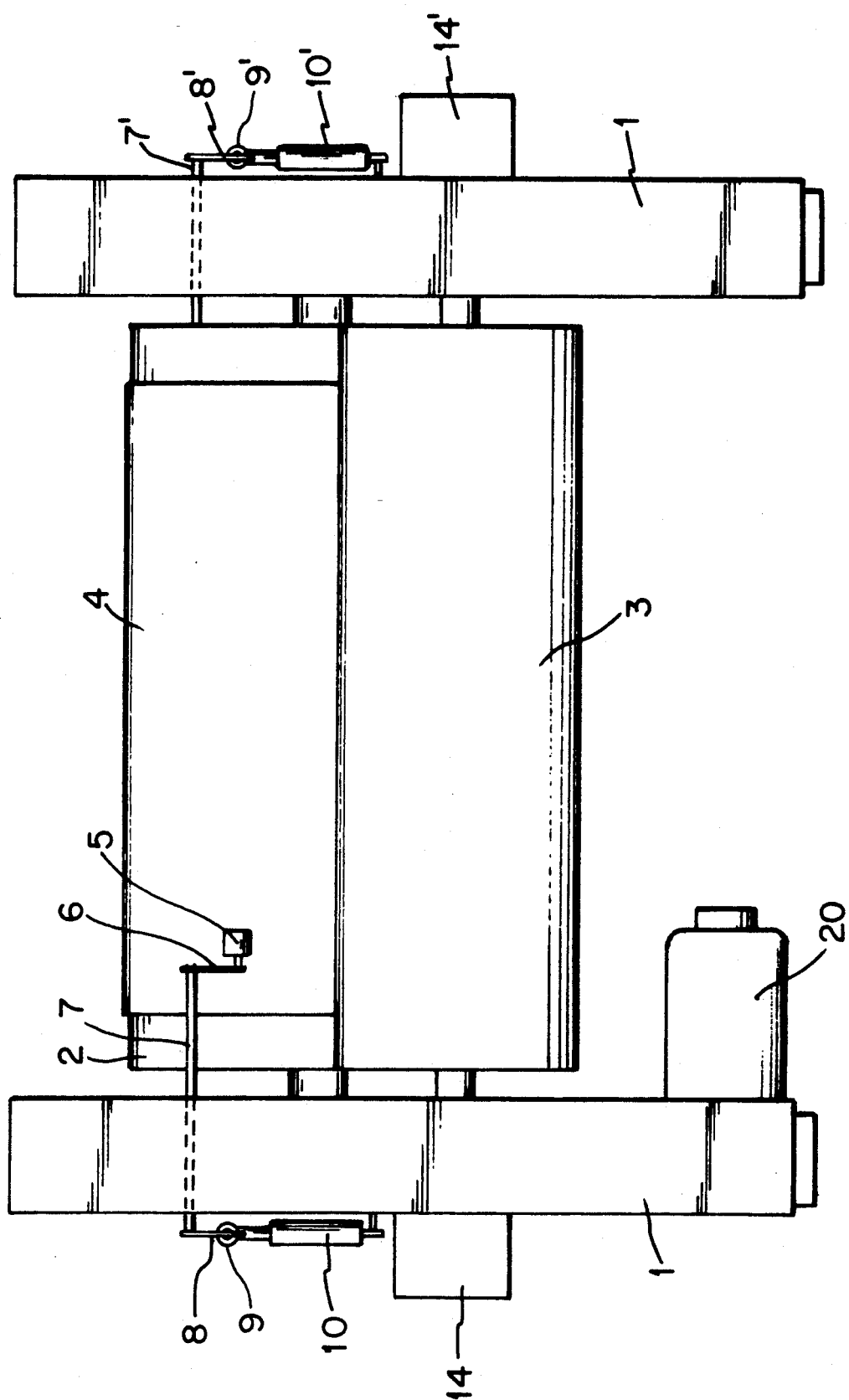
FIG. 2 is a schematic front elevation of the calender.
Figure 3:
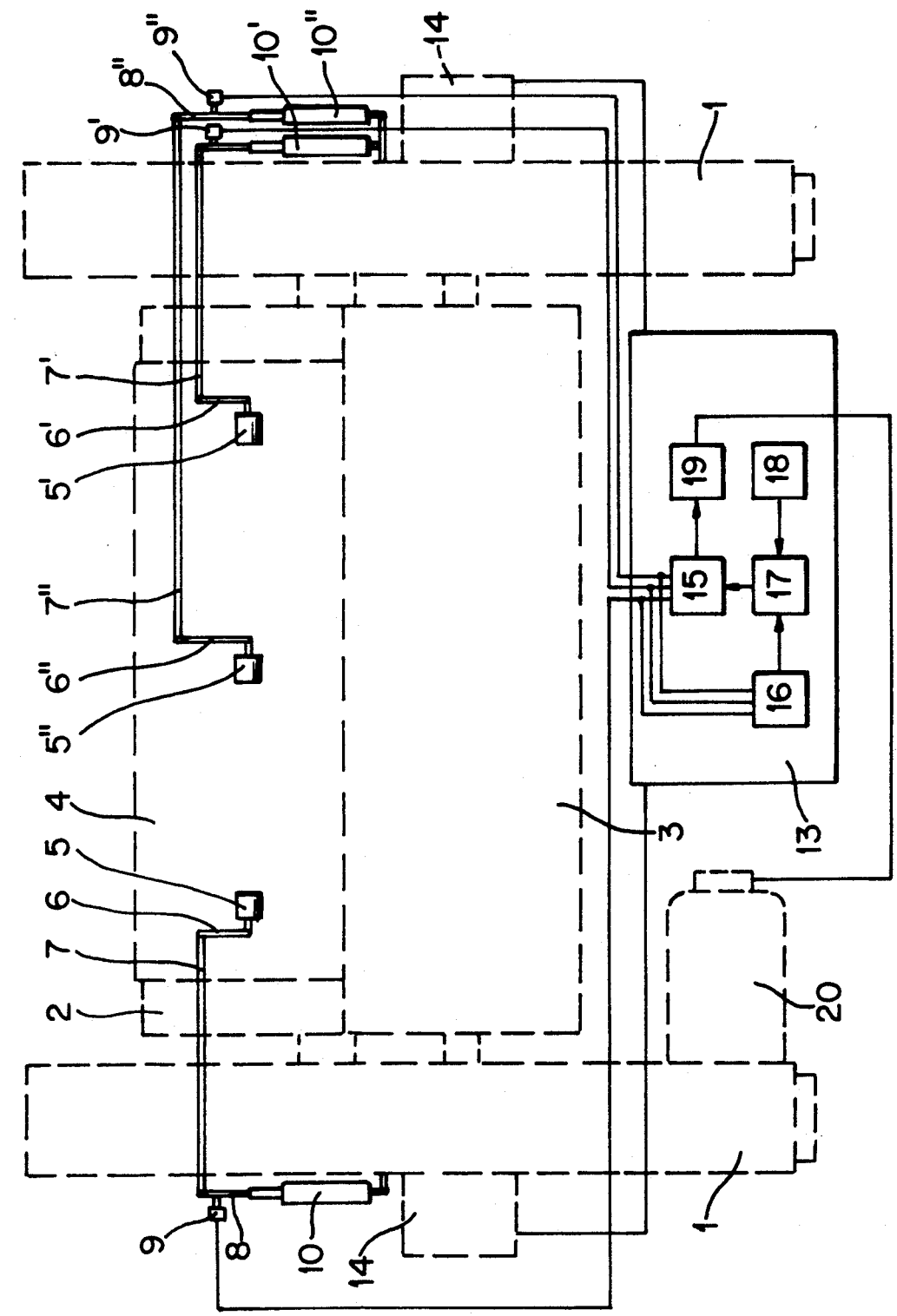
FIG. 3 is a schematic drawing and circuit diagram of the feeler arrangement.
Figure 4:
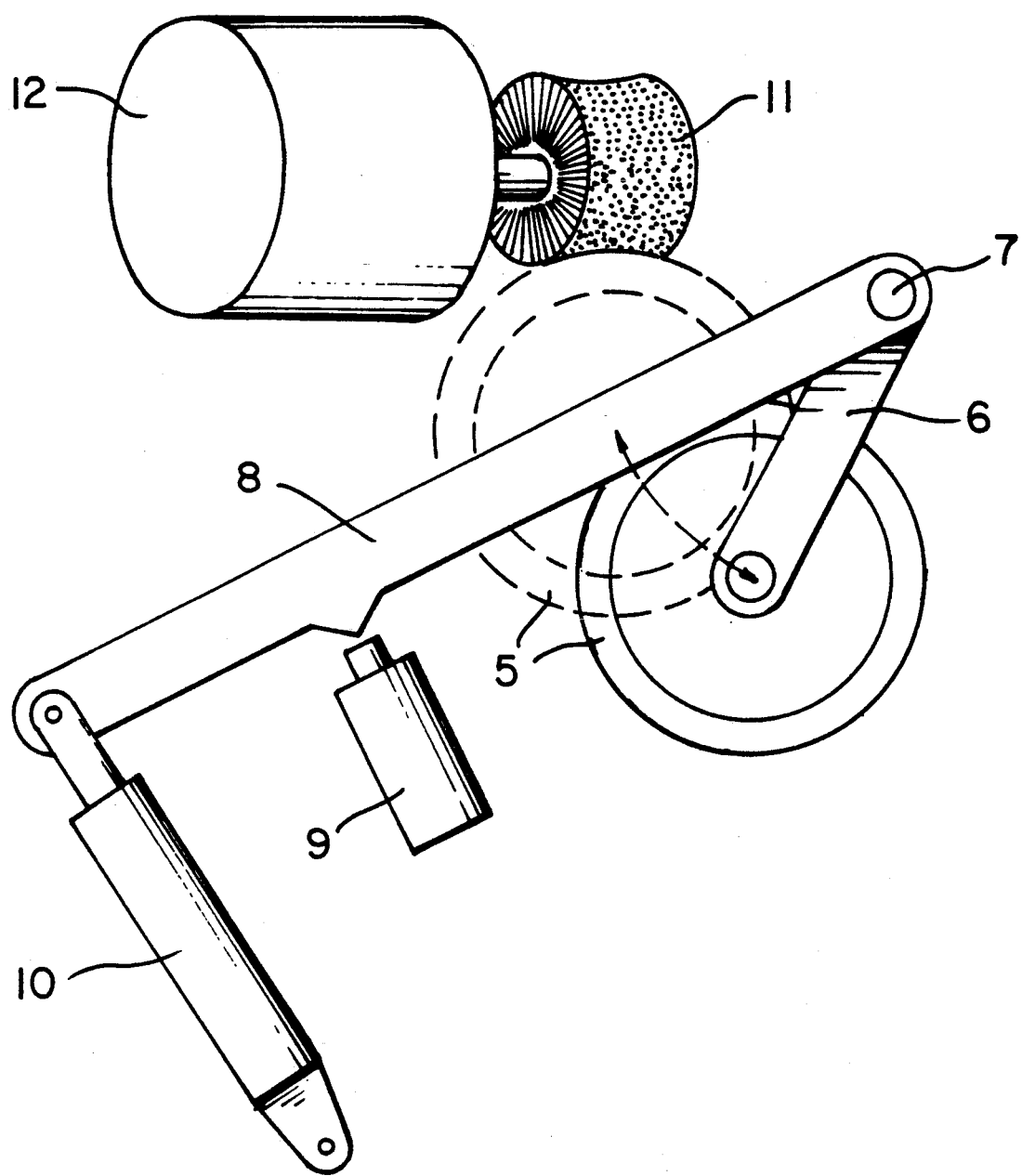
FIG. 4 is a schematic perspective view of the feeler roller mechanism and the cleaning device and, FIG. 5 is a schematic plan view of the feeler device.
Figure 5:
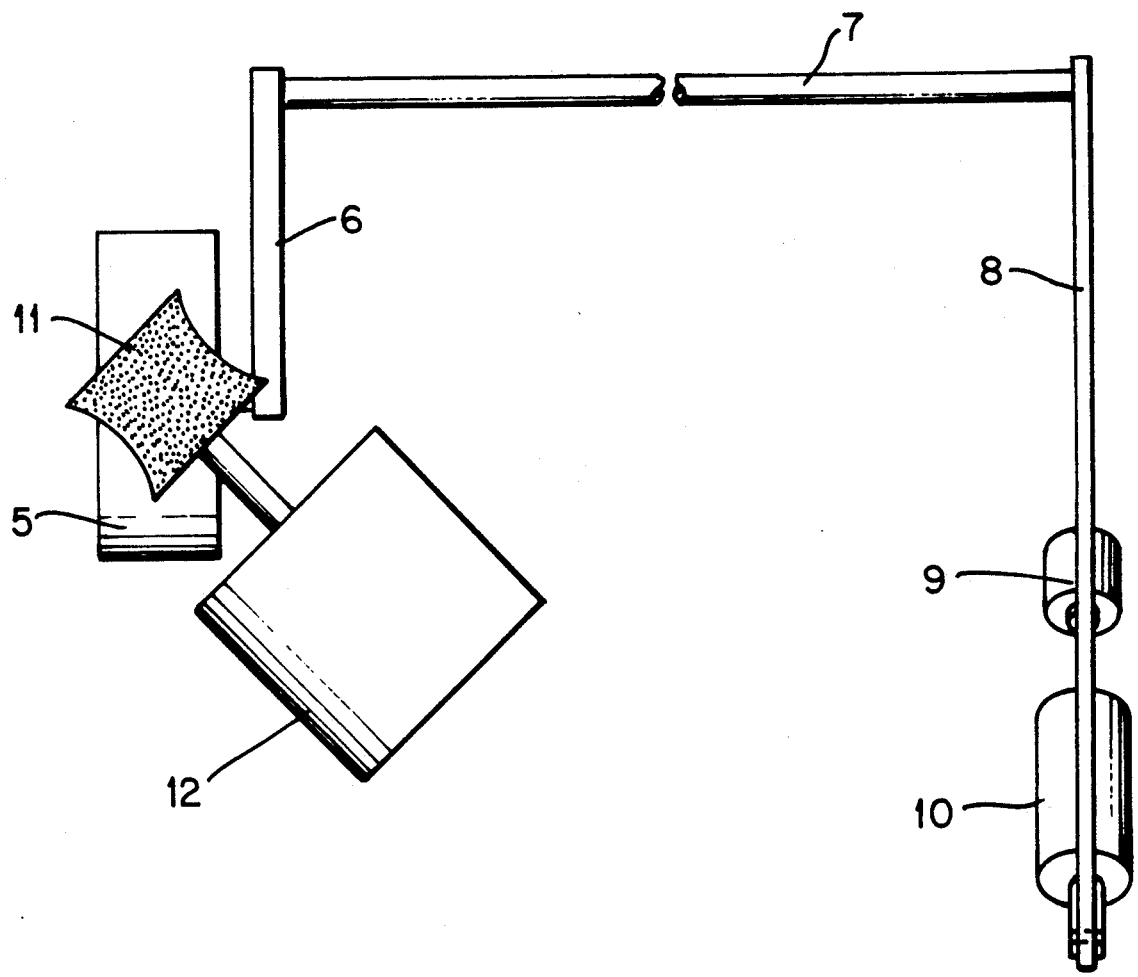

In addition to the feeler roller 5, there is provided a further roller 5∝ on the other side of the heated cylinder. The movement of this feeler roller 5' is followed and measured by a second sensor 9'. While the feeler roller 5 is arranged on the front of the heated cylinder, the feeler roller 5' is arranged on the back of the heated cylinder 2. Hence in FIG. 2 this feeler roller 5' is not seen but only its corresponding sensor 9'. The sensors 9 and 9' are connected to inputs of a microprocesser for controlling operation of the calender for example as disclosed in patent application Ser. No. 07/694,222 filed Apr. 8, 1991.

Moreover there is provided a third feeler roller 5" which is located in a middle region of the heated cylinder 2. A corresponding sensor 9" responsive to the position of the feeler roller 5" is connected to a circuit in the micro-processor 13 for controlling a counter bending device 14 for the counter pressure-roller 3.

The sensors 9, 9' and 9" are preferably arranged on the sides of the calender stands 1 opposite to the sides on which the heated cylinder 2 is located so that heat from the heated cylinder 2 cannot affect the sensors.

The sensors 9, 9' and 9" are connected with inputs of the micro-processor 13. They work here on a comparison circuit 15 after their zero values, when the feeler rollers engage the bare circumferencial surface of the heated cylinder at the beginning of operation, have been recorded in a memory 16. These zero values are fed to an addition circuit 17 where they are added to desired values supplied by the desired value setting means 18. The output of the addition circuit 17 is connected with the comparison circuit 15 and imparts to this a desired value corrected by a zero value while the actual value is applied to the comparison circuit 15 by the sensors 9-9". The output of the comparison circuit 17 is connected with switch means 19 for stopping the driving motor of the calender 20 when a predetermined value is reached. The completed packing sheet is then removed by making a cut parallel to the axis of the heated cylinder and in, a raised position away from said circumferential surface of said heated cylinder.

What I claim is:

1. A calender for the production of packing sheets, said calender comprising a heated cylinder of large diameter on which a packing sheet is progressively built up during many revolutions of said cylinder, stationary bearings in spaced calender stands rotatably supporting said large diameter cylinder for rotation about a central axis, an unheated counter pressure cylinder of smaller diameter than said heated cylinder, slidable bearings in said calender stands supporting said unheated cylinder for rotation and for movement toward and away from said heated cylinder, means for driving said cylinders in rotation and means for controlling said driving means, at least one feeler supported for movement toward and away from said axis of said heated cylinder, means for lightly pressing said feeler initially into engagement with the bare circumferential surface of said heated cylinder at the beginning of an operation and subsequently into engagement with the surface of a packing sheet as said packing sheet is being progressively built-up on said heated cylinder, means for sensing the position of said feeler relative to said axis and producing a signal indicative of such position, whereby the difference between the initial position of said feeler when in engagement with the bare circumferential surface of said heated cylinder and subsequent positions when in engagement with the outer surface of said packing sheet as it is progressively built up on the circumferential surface of said heated cylinder represents the thickness of a packing sheet on said heated cylinder engaged by said feeler, circuitry having an input connected with said sensing means to receive said signal and an output connected with said means for controlling said driving means, said circuitry comprising memory means for storing an initial signal value, when said feeler means engages the bare circumferential surface of said heated cylinder, as a zero thickness value, means for supplying a predetermined thickness value, a comparison circuit for comparing successive thickness indicating signal values received from said sensing means, as a packing sheet is progressively built-up on said heated cylinder, with the sum of said zero value and said predetermined desired thickness value and means for stopping built-up of said packing sheet on said heated cylinder when the value of said thickness indicating signal received from said sensing means equals the sum of said zero value and said predetermined desired value.

2. A calender according to claim 1, in which said feeler is a roller rotatably supported on a lever which is pivotally mounted for movement of said feeler roller toward and away from the circumferential surface of said heated cylinder.

3. A calender according to claim 2 further comprising means for moving said feeler roller to, and retaining it in, a raise position away from said circumferential surface of said heated cylinder.

4. A calender according to claim 3, further comprising means for cleaning said feeler roller when in said raised position.

5. A calender according to claim 4, in which said cleaning means comprises a rotatable brush and means for driving said cleaning brush in rotation.

6. A calender according to claim 5, in which said rotatable brush has a periphery of concave form and in which the axis of said rotatable brush is disposed at an angle to the axis of said feeler roller, whereby rotation of said brush imparts rotary movement to said feeler roller as is it being cleaned.

7. A calender according to claim 5, in which said means for driving said brush in rotation is pneumatic.

8. A calender according to claim 2, in which said lever is an arm on a rotatable shaft which is parallel to the axis of said heated cylinder.

9. A calender according to claim 8, in which a second arm on said shaft activates said sensing means.

10. A calender according to claim 9, in which said second arm and said sensing means are on a side of a calender stand remote from said heated cylinder so that heat from said heated cylinder does not affect said sensing means.

11. A calender according to claim. 1, in which there are two feelers located respectively between the middle and two ends of said heated cylinder.

12. A calender according to claim 11, in which said two feelers are located respectively on diametrically opposite sides of said heated cylinder.

13. A calender according to claim 11, further comprising counter bending means for counteracting bending of said unheated cylinder and a third feeler located in a middle region of said heated cylinder and connected with said counter bending means.

14. A calender according to claim 3 in which said means for moving said feeler roller to a raised position comprises a cylinder-piston unit.

15. In a process for the production of packing sheets on a calender comprising a rotatable heated cylinder of large diameter on which a packing sheet is progressively built-up by the application of a rubber fiber mixture to the circumferential surface of said heated cylinder during many revolutions of said cylinder and an unheated counter pressure cylinder which is of smaller diameter than said heated cylinder and is movable toward and away from said heated cylinder, the improvement which comprises, continually measuring the thickness of a packing sheet as it built-up on said heated cylinder by means of at least one feeler which initially engages the bare circumferential surface of said heated cylinder, before any application of rubber-fiber mixture thereto, and subsequently engages the surface of said packing sheet as it is built-up on said heated cylinder, recording in a memory an initial measurement made before application of rubber-fiber mixture to the circumferential surface of said heater cylinder as a zero value, comparing the successive measurements thus obtained with the sum of a predetermined value added to said initial measurement and controlling said calender to stop built-up of said packing sheet when the measured value equals the sum of said predetermined value and said zero value.

16. A process according to claim 15, further comprising the steps of raising said feeler from the packing sheet after build-up of a packing sheet has been stopped and cleaning said feeler.

17. A process according to claim 16, in which said feeler is a roller on a pivoted arm and in which said cleaning is effected by a rotating brush engaging the periphery of said feeler roller.

18. A process according to claim 17, in which a rotary movement is imparted to said roller as it is being cleaned.

19. A process according to claim 15, in which the thickness of said packing sheet is measured concurrently at two locations located respectively between a midpoint in the length of said heated cylinder and opposite ends of said cylinder.

20. A process according to claim 19, in which said two locations are on diametrically opposite sides of said cylinder.

21. A calender for the production of packing sheets, said calender comprising a heated cylinder of large diameter on which a packing sheet is progressively built-up during many revolutions of said cylinder, stationary bearings in spaced calender stands rotatable supporting said large diameter cylinder for rotation about a central axis, an unheated counter pressure cylinder of smaller diameter than said heated cylinder, slidable bearings in said calender stands supporting said unheated cylinder for rotation and for movement toward and away from said heated cylinder, means for driving said cylinders in rotation and means for controlling said driving means, means for measuring the increasing thickness of a packing sheet as it is built-up on said heated cylinder, said measuring means comprising a rotatably supported shaft parallel to the axis of said heated cylinder, an arm projecting integrally from said shaft, a feeler carried by said arm and engageable with the bare circumferential surface of said heated cylinder at the beginning of an operation and with the surface of a packing sheet as said packing sheet is progressively built-up on said heated cylinder, means for sensing rotary movement of said shaft and thereby sensing the position of said feeler and producing a signal indicative of the thickness of a packing sheet on said heated cylinder engaged by said feeler, and circuitry having an input connected with said sensing means to receive said signal and an output connected with said means for controlling said driving means, said circuitry comprising memory means for storing an initial thickness indicating signal value, when said feeler means engages the bare circumferential surface of said heated cylinder, as a zero thickness value, means for supplying a predetermined thickness value, a comparison circuit for comparing successive thickness indicating signal values received from said sensing means, as a packing sheet is progressively built-up on said heated cylinder, with the sum of said zero value and said predetermined desired thickness value and means for stopping build-up of said packing sheet on said heated cylinder when the value of said thickness indicating signal received from said sensing means equals the sum of said zero value and said predetermined desired value.

* * * * *